Oct. 18, 1949.　　　　　B. M. HYMAN　　　　2,484,999
CORN COMBINE WITH SHELLER
Filed Nov. 28, 1947　　　　　　　　　　3 Sheets-Sheet 1

INVENTOR.
Benjamin M. Hyman

Oct. 18, 1949.  B. M. HYMAN  2,484,999
CORN COMBINE WITH SHELLER
Filed Nov. 28, 1947  3 Sheets-Sheet 2

INVENTOR.
Benjamin M. Hyman
Paul O. Pippel
Atty.

Oct. 18, 1949.  B. M. HYMAN  2,484,999
CORN COMBINE WITH SHELLER
Filed Nov. 28, 1947  3 Sheets-Sheet 3

INVENTOR.
Benjamin M. Hyman

Patented Oct. 18, 1949

2,484,999

UNITED STATES PATENT OFFICE 2,484,999

CORN COMBINE WITH SHELLER

Benjamin M. Hyman, Moline, Ill., assignor to International Harvester Company, a corporation of New Jersey Application November 28, 1947, Serial No. 788,545

8 Claims. (Cl. 56—18)

1

This invention relates to a new and improved corn harvester sheller and has for one of its principal objects the provision of sheller means positionable at the rear of a tractor and adapted to receive ears of corn from a picker unit mounted on the tractor.

An important object of this invention is to provide a shelling device mounted at the rear of a tractor-mounted corn picker and adapted to deliver shelled grain toward the center of the tractor and to deliver husks and cobs laterally away from the tractor.

Another important object of this invention is to provide a transversely positioned corn shelling cylinder arranged to receive snapped ears from a corn picking device and having in combination therewith husk eliminating rolls and a transverse auger to discharge husks and stripped cobs from the shelling means.

Still another object of this invention is to provide fan cleaning means for corn shelled by a corn harvester.

Another and still further important object of this invention is to provide means for delivering shelled corn to a position substantially centrally of the tractor and delivering stripped cobs to the inner end of a shelling cylinder and thence into a transversely delivering auger conveyor whereupon the stripped cobs are delivered outwardly and laterally of the tractor.

Still another object of this invention is to provide a first compartment for corn shelled by a shelling rotor and a second compartment for shelled corn obtained from husks and cobs and from the first compartment, fan means for cleaning the shelled corn in the second compartment, and auger conveyor means for delivering the shelled corn in the second compartment to a delivery elevator.

A further object of this invention is to provide a corn shelling attachment for corn pickers in which all the rotating elements of the shelling attachment are on transverse axes for convenience in driving and efficient operation.

Other and further important objects will become apparent from the disclosures in the following specification and accompanying drawings in which:

Fig. 3 is a sectional view taken on the line 3—3 of Fig. 2.

2

Figure 4:
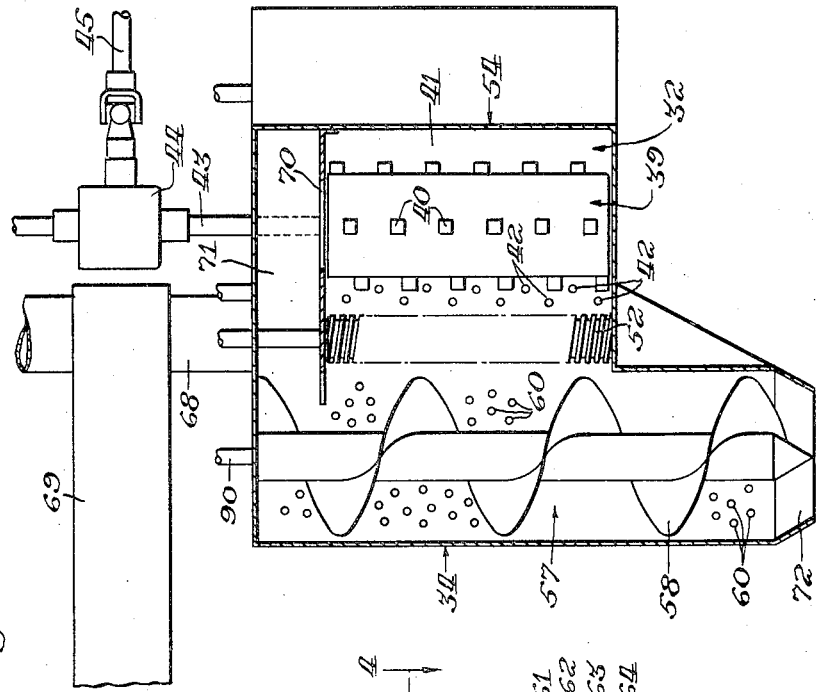
Figure 5:
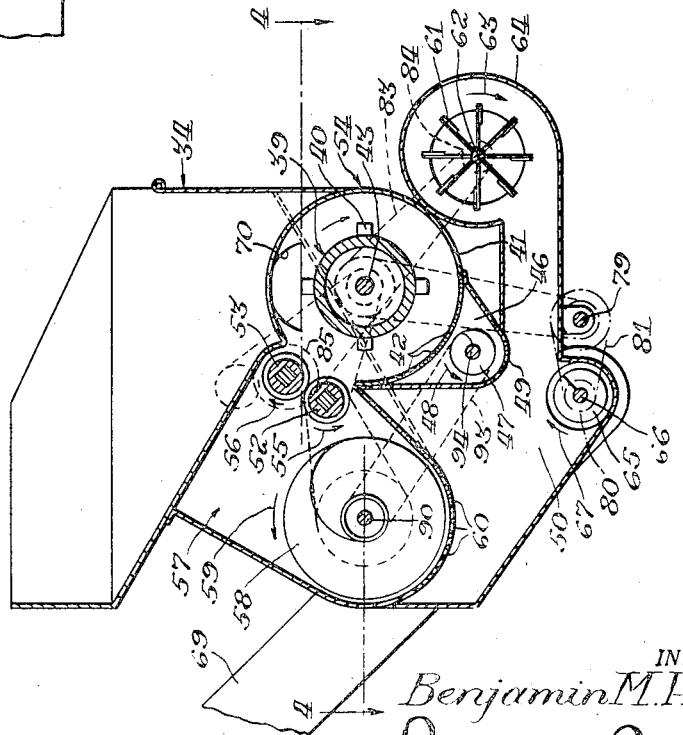

Fig. 4 is a sectional view taken on the line 4—4 of Fig. 3.

As shown in the drawings, the reference numeral 10 indicates generally a tractor having a longitudinally disposed narrow chassis or frame 11 which carries an engine 12 and is supported at its front by dirigible wheels 13 and at its rear by widely spaced large traction wheels 14 and 15. The wheels 14 and 15 are mounted respectively on laterally extending axles 16 and 17 which are in turn carried in axle housings 18 and 19.

Figure 1:
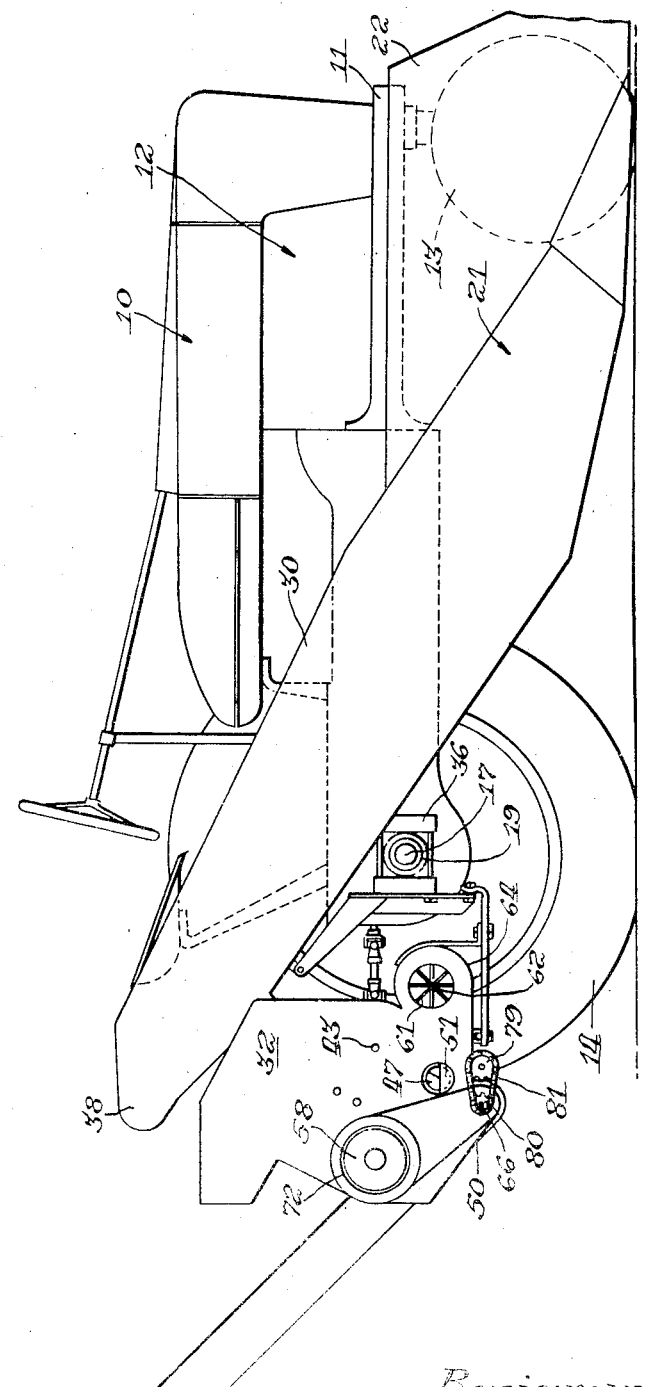
Fig. 1 is a side elevational view of the tractor-mounted corn harvester sheller of this invention.
Figure 2:
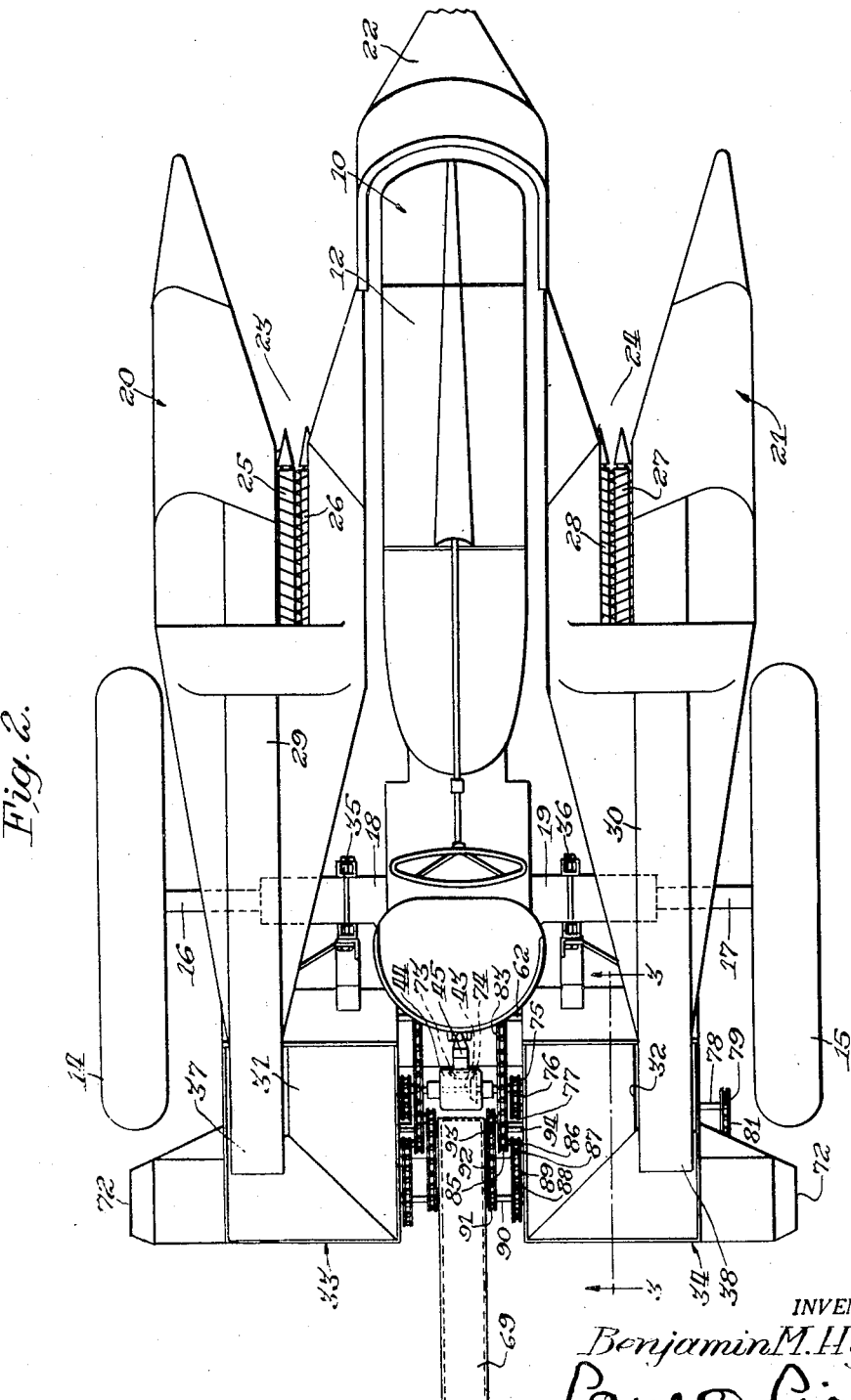
Fig. 2 is a top plan view of the device as shown in Fig. 1.

As best shown in Figs. 1 and 2, corn picker units 20 and 21 are mounted alongside and closely adjacent to the elongated chassis 11 of the tractor 10. A center divider 22 is positioned over and around the dirigible wheels 13 of the tractor to pick up fallen stalks and to direct them into the throats 23 and 24 of the picker units 20 and 21 respectively. The standing corn stalks are fed between cooperative snapping rolls 25 and 26, and 27 and 28. The cooperative rolls are adapted to rotate inwardly toward each other, whereupon the stalks are pulled through and the ears of corn are snapped from the stalk and delivered to rearwardly and upwardly extending elevators 29 and 30 of the picker units 20 and 21 respectively. The ears of corn are carried upwardly and rearwardly by the elevators 29 and 30 over the rear axles 16 and 17 of the tractor 10 and are adapted to discharge the ears of corn into receiving hoppers 31 and 32.

The receiving hoppers 31 and 32 form an integral part of the corn shelling mechanisms designated by the numerals 33 and 34. The corn shelling mechanisms are attached to the tractor by clamp means 35 and 36 engaging the axle housings 18 and 19 respectively. Each of the shelling mechanisms 33 and 34 are so disposed at the rear of the tractor that the outwardly positioned hoppers 31 and 32 are located beneath the rear discharge ends 37 and 38 of the elevator portions 29 and 30 respectively of the picker units 20 and 21.

The picking and shelling units are symmetrical about the longitudinally extending tractor chassis 11 and it is immaterial to the invention as to whether one or two units are employed. It should be understod that when one unit is employed only one row of standing corn may be picked at a time. However, when two units are employed, two rows of corn may be simultaneously picked. In any event, the elements of the two picker units as well as the shelling attachments are identical, and from this point forward only one side of the shelling unit will be described and numbered in detail.

Fig. 4 shows substantially a top plan view of the shelling mechanism 34 with the top removed. A shelling cylinder or rotor 39 is provided with lugs 40 to engage an ear of corn and dislodge and remove kernels therefrom. As shown in Fig. 3 the shelling cylinder 39 is equipped with a concave 41 having a plurality of perforations 42 over a portion of the bottom thereof. The shelling cylinder 39 is mounted on a shaft 43 which projects within a gear housing 44 having elements therein driven by a power take-off shaft 45 extending from the rear of the tractor 10. The lugs 40 on the shelling cylinder 39 are arranged in a spiral fashion so that ears of corn fed to the hopper 32 at the outer end of the rotor 39 will be carried inwardly toward the center of the tractor. The lugs 40 tend to strip the kernels of corn from the cob and when stripped the corn falls through the openings 42 in the concave 41 and thence down into a first compartment or receptacle 46. An auger or worm type conveyor 47 is positioned in the compartment 46 and is adapted to rotate in the direction indicated by the arrow 48 in Fig. 3. The bottom of the compartment 46 is perforated as shown by the openings 49 whereupon cleaned corn is dropped therethrough into a second compartment or receptacle 50. The worm 47 conveys stalks or other material and small pieces of cob to the extreme outer end as shown in Fig. 1, where this material is discharged to the ground. A small baffle 51 will not allow shelled corn to be lost.

Cooperative husk removing and husk eliminating rolls 52 and 53 are positioned alongside and parallel to the shelling cylinder 39 along the rear side thereof and near the top of the shelling chamber 54 which houses the cylinder 39. The rolls 52 and 53 rotate away from each other as indicated by the arrows 55 and 56 in order to pull loose husks from the shelling chamber 54.

The husk eliminating rolls 52 and 53 are adapted to deliver the husks and other material to a generally cylindrical receptacle 57 transversely arranged at the rear of the shelling chamber 54 and the husk removing rolls 52 and 53. The chamber or receptacle 57 carries a transversely positioned auger conveyor 58 rotating in the direction of the arrow 59 and delivering material laterally outwardly from the tractor 10 in the same manner as the auger or worm 47. The outward discharge end of the auger 58 is shown in Fig. 1 of the drawings. The generally cylindrical receptacle 57 is provided with a bottom having perforations 60 through which shelled corn is dropped. Oftentimes the husks will have several kernels lodged therein and if the husks were to be dropped directly to the ground these entrained kernels of corn would be lost. In this device, however, the rotation of the large auger 58 agitates the husks sufficiently to dislodge any corn held within the husks and the corn is thus dropped through the perforated bottom and into the compartment 50 along with the shelled corn which has come through the perforated concave of the shelling cylinder and through the perforated bottom of the cleaning or first compartment 46.

A blower fan 61 mounted on a shaft 62 is rotatably driven in the direction of the arrow 63 within a cylindrical housing 64. The housing 64 joins the compartment 50 through which shelled corn is adapted to fall. The fan directs a blast of air through the chamber 50 and all material lighter than kernels of corn are separated from the corn and carried out with the wind created by the fan 61. The fan 61 therefore becomes a cleaning fan and the kernels of corn are air cleaned before they are deposited onto and in an auger or worm conveyor 65. The auger 65 is mounted on a shaft 66 and is rotated in the direction indicated by the arrow 67 and arranged to feed material through the conduit 68 to the upwardly and rearwardly extending wagon elevator 69. The wagon elevator 69 is positioned substantially centrally of the tractor and is arranged and constructed to deliver shelled grain to a trailing wagon or the like.

The shelling of the corn is accomplished by maintaining the shelling chamber relatively full of ears so that the friction of the ears between themselves cause considerable stripping of kernels from the ears. In order to maintain the shelling chamber substantially full a stripped cob exit 70 is relatively small and positioned at the inner end of the shelling cylinder 39. As the stripped cobs work their way out of the opening 70, they thereupon fall through the passage 71 into the husk discharging auger 58 and are thus discharged along with the husks out of the outer opening 72 of the chamber 57. Any kernels of corn that may be discharged with the cobs through the opening 70 are regained through the perforated bottom of the chamber or compartment.

The source of driving power for the various elements is obtained from the tractor power take-off shaft 45, which as shown in Fig. 2 carries the drive rearwardly to the gear box 44 which houses a bevel gear 73 and the cooperative bevel gear 74 at right angles thereto, whereby power take-off shaft drive is imparted to the transversely extending shaft 43 which also carries the shelling cylinder 39. Drive is thus imparted to both corn shelling units 33 and 34 in the same manner. A sprocket 75 keyed or otherwise fastened to the shaft 43 imparts drive to a chain 76 engaging a sprocket 77 on a shaft 78, the other end of which carries a sprocket 79 for imparting drive to the auger 65 through the medium of sprocket 80 and chain 81. A second sprocket 82 fastened to the shaft 43 carries a chain 83 which imparts drive to a sprocket 84 mounted on the chain shaft 62 and thereupon imparts rotational drive to the chain 61.

Another sprocket 85 mounted on the shaft 86 receives drive from the chain 83 and thus imparts rotation to the husk removing roll 53. Another sprocket 87 mounted on the shaft 86 is adapted to drive a sprocket 88 through the medium of a chain 89. The sprocket 88 is mounted on a shaft 90 which carries the husk and cob discharge auger 58. A sprocket 91 also mounted on the shaft 90 carries a chain 92 which in turn is mounted on a sprocket 93 on a shaft 94, which, as shown in Fig. 3, carries the recleaner auger 47. The shaft 66, in addition to carrying the auger 65 drives the wagon elevator 69.

In operation, the tractor-mounted corn harvester of this invention traverses a field of standing corn, whereupon the picking units 20 and 21 act to raise and guide the stalks within the gathering points and direct them into the cooperative snapping rolls 25 and 26, and 27 and 28. The ears are snapped from the stalks and are carried upwardly and rearwardly over the rear axles 16 and 17 to points 37 and 38 where the snapped ears are dropped down into receiving hoppers 31 and 32 of the corn shelling mechanisms mounted on the rear of the tractor. The ears of corn thereupon fall into the shelling compartment 54 where they are placed in proximity to the shelling cylinder or rotor 39 causing stripping of the kernels of corn and a delivery of the shelled corn downwardly through the perforated concave and into the first compartment 46 where the grain is cleaned by the outwardly discharging auger 47. The husks are removed from the shelling chamber 54 by means of the cooperative rolls 52 and 53 which deposit the husks into the transversely positioned auger 58. The stripped cobs pass out the restricted opening 70 at the inner end of the shelling compartment 54 and from there are deposited in the passage 71 which feeds to the large auger 58, whereupon the husks and the cobs are discharged together outwardly and laterally of the machine. Kernels of corn held by either the husks or cobs fall through the perforated bottom of the chamber 57 and drop through the compartment 50 along with corn dropping through the perforated bottom of the compartment 46. The fan 61 delivers a blast of wind through this compartment 50 and removes dust or other foreign particles, thus cleaning the corn before it is deposited into the auger 65 for delivery to the wagon elevator 69.

Numerous details of construction may be varied throughout a wide range without departing from the principles disclosed herein, and I therefore do not propose limiting the patent granted hereon otherwise than as necessitated by the appended claims.

What is claimed is:

1. A shelling device for tractor mounted corn harvesters of the type having a picker unit mounted alongside the tractor, means on said picker unit for picking ears from standing stalks and carrying the ears rearwardly of the tractor, and the shelling device mounted at the rear of the tractor and including a hopper positioned to receive ears from said picker unit, a transversely arranged shelling chamber, a shelling cylinder mounted in said chamber, a concave beneath said cylinder and having perforations therethrough, said hopper being positioned at the outer end of the chamber, lug means on the cylinder arranged in a spiral fashion whereby ears of corn delivered by the picker unit to the hopper are fed by the cylinder lug means axially thereof toward the center of the tractor, a pair of husk eliminating rolls arranged along the rear side of said chamber, a perforated bottom and open end receptacle positioned at the rear of said husk eliminating rolls, a conveyor mounted in said receptacle and adapted to carry material laterally away from the tractor in a direction opposite to that of the direction of feed by the shelling cylinder whereby shelled corn is dropped through the bottom perforations and the husks are discharged outwardly from the tractor by the conveyor in said receptacle.

2. A shelling device for tractor mounted corn harvesters of the type having a picker unit mounted alongside the tractor, means on said picker unit for picking ears from standing stalks and carrying the ears rearwardly of the tractor, and the shelling device mounted at the rear of the tractor and including a hopper positioned to receive ears from said picker unit, a transversely arranged shelling chamber, a shelling cylinder mounted in said chamber, a concave beneath said cylinder and having perforations therethrough, said hopper being positioned at the outer end of the chamber, lug means on the cylinder arranged in a spiral fashion whereby ears of corn delivered by the picker unit to the hopper are fed by the cylinder lug means axially thereof toward the center of the tractor, a pair of husk eliminating rolls arranged along the rear side of said chamber, a generally cylindrical receptacle transversely arranged at the rear of said husk eliminating rolls, rotatable auger conveyor journally mounted in said receptacle and having flights thereon arranged and constructed to deliver material in a direction opposite to the shelling cylinder, the outer end of said receptacle being open to discharge husks and other material therefrom, said shelling chamber having an opening at the inner end thereof for discharging cobs and other refuse material into said receptacle, whereby shelled corn drops through the perforated concave and husks and cobs delivered to said receptacle through the husk eliminating rolls and the opening at the inner end of the shelling chamber respectively are delivered outwardly from the tractor by means of the auger conveyor in said receptacle.

3. A shelling device for tractor mounted corn harvesters of the type having a picker unit mounted alongside the tractor, means on said picker unit for picking ears from standing stalks and carrying the ears rearwardly of the tractor and the shelling device mounted at the rear of the tractor and including a hopper positioned to receive ears from said picker, a transversely arranged shelling chamber, a shelling cylinder mounted in said chamber, a concave beneath said cylinder and having perforations therethrough, said hopper being positioned at the outer end of the chamber, lug means on the peripheral surface of the cylinder arranged in spiral fashion whereby ears of corn delivered by the picker unit to the hopper are fed by the cylinder lug means axially thereof toward the center of the tractor, a pair of husk eliminating rolls arranged along the rear side of said chamber, a generally cylindrical receptacle transversely arranged at the rear of said husk eliminating rolls, an auger conveyor mounted in said receptacle and constructed and arranged to deliver material through said cylindrical receptacle in a direction opposite to the direction of feed of the shelling cylinder, the outer end of said receptacle and that end toward which the auger conveyor feeds being open to discharge husks and other material therefrom, said shelling chamber having an opening at the inner end thereof for discharging cobs and other refuse material into said receptacle, said receptacle having a perforate bottom to provide for the discharge of any shelled grain which may enter the receptacle with husks and cobs, a first compartment beneath the shelling chamber and a second separate compartment beneath said receptacle, and conveyor means in each of said compartments.

4. A shelling device for tractor mounted corn harvesters of the type having a picker unit mounted alongside the tractor, means on said picker unit for picking ears from standing stalks and carrying the ears rearwardly of the tractor, and the shelling device mounted at the rear of the tractor and including a hopper positioned to receive ears from said picker unit, a transversely arranged shelling chamber, a rotatable shelling cylinder mounted in said chamber, said cylinder having shelling and feeding lugs arranged in a spiral fashion therearound, a concave beneath said cylinder and having perforations therethrough, said hopper being positioned at the outer end of the chamber whereby ears of corn delivered by the picker unit to the hopper are fed by the cylinder lugs axially thereof toward the center of the tractor, a pair of husk eliminating rolls arranged along the rear side of said chamber, a generally cylindrical receptacle transversely arranged at the rear of said husk eliminating rolls, an auger conveyor journally mounted for rotation in said receptacle and adapted to feed material through said receptacle, the outer end of said receptacle being open to discharge husks and other material therefrom, said shelling chamber having an opening at the inner end thereof for discharging cobs and other refuse material into said receptacle, said receptacle having a perforate bottom to provide for the discharge of any shelled grain which may enter the receptacle with husks and cobs, a first compartment beneath the shelling chamber having a perforate bottom and a second separate compartment beneath said receptacle and extending beneath said first compartment, a wagon elevator mounted on the rear of the tractor and arranged and constructed to deliver corn shelled by the corn harvester to a trailing wagon, and auger conveyor means in the second of said compartments for delivering shelled corn to said wagon elevator.

5. A shelling device for tractor mounted corn harvesters of the type having a picker mounted alongside the tractor, means on said picker unit for picking ears from standing stalks and carrying the ears rearwardly of the tractor, and the shelling device mounted at the rear of the tractor and including a hopper positioned to receive ears from said picker unit, a transversely arranged shelling chamber, a rotatable shelling cylinder mounted in said chamber, said cylinder having combination shelling and feeding lugs mounted in a spiral fashion on the periphery thereof, a concave beneath said cylinder and having perforations therethrough, said hopper being positioned at the outer end of the chamber whereby ears of corn delivered by the picker unit to the hopper are fed by the cylinder axially thereof toward the center of the tractor, a pair of husk eliminating rolls arranged along the rear side of said chamber, a generally cylindrical receptacle transversely arranged at the rear of said husk eliminating rolls, a rotatable auger conveyor mounted in said receptacle, the outer end of said receptacle at the discharge end of the auger conveyor being open to discharge husks and other material therefrom, said shelling chamber having an opening at the inner end thereof for discharging cobs and other refuse material into said receptacle, said receptacle having a perforate bottom to provide for the discharge of any shelled grain which may enter the receptacle with husks and cobs, a first compartment beneath the shelling chamber having a perforate bottom, an auger positioned in said first compartment arranged and constructed to carry all material therein across the perforate bottom to permit shelled corn to drop therethrough, said first compartment having an opening in the end thereof whereby the auger in said first compartment feeds foreign matter out the opening in the end of the compartment, a second separate compartment beneath said receptacle and said first compartment, and a cleaning fan adapted to discharge a blast of air through the second of said compartments, whereby dust and other foreign particles are separated from shelled corn coming through the perforate of the receptacle and said first compartment.

6. A shelling device for tractor mounted corn harvesters of the type having a picker unit mounted alongside the tractor, means on said picker unit for picking ears from standing stalks and carrying the ears rearwardly of the tractor, and the shelling device mounted at the rear of the tractor and including a hopper positioned to receive ears from said picker unit, a transversely arranged shelling chamber, a rotatable shelling cylinder mounted in said chamber, said shelling cylinder having lugs arranged in a spiral fashion over the surface thereof, a concave beneath said cylinder and having perforations therethrough, said hopper being positioned at the outer end of the chamber whereby ears of corn delivered by the picker unit to the hopper are fed by the cylinder lugs axially thereof toward the center of the tractor, a pair of husk eliminating rolls arranged along the rear side of said chamber, a generally cylindrical receptacle transversely arranged at the rear of said husk eliminating rolls, a rotatable auger conveyor mounted in said receptacle, the outer end of said receptacle adjacent the discharge end of the auger conveyor being open to discharge husks and other material therefrom, said shelling chamber having an opening at the inner end thereof for discharging cobs and other refuse material into said receptacle, said receptacle having a perforate bottom to provide for the discharge of any shelled grain which may enter the receptacle with husks and cobs, a first compartment beneath the shelling chamber having a perforate bottom, an auger positioned in said first compartment arranged and constructed to carry all material therein across the perforate bottom to permit shelled corn to drop therethrough, said first compartment having an opening in the end thereof whereby the auger in said first compartment feeds foreign matter out the opening in the end of the compartment, a second separate compartment beneath said receptacle and said first compartment, and a cleaning fan adapted to discharge a blast of air through the second of said compartments, whereby dust and other foreign particles are separated from shelled corn coming through the perforate of the receptacle and said first compartment, and auger conveyor means arranged and constructed in the second compartment to deliver cleaned shelled corn toward the center of said tractor.

7. A shelling device for tractor mounted corn harvesters of the type having a picker unit mounted alongside the tractor, means on said picker unit for picking ears from standing stalks and carrying the ears rearwardly of the tractor, and the shelling device mounted at the rear of the tractor and including a hopper positioned to receive ears from said picker unit, a transversely arranged shelling chamber, a rotatable shelling cylinder mounted in said chamber, combination shelling and feeding means spirally arranged on said cylinder, a concave beneath said cylinder and having perforations therethrough, said hopper being positioned at the outer end of the chamber whereby ears of corn delivered by the picker unit to the hopper are fed by the cylinder feeding means axially thereof toward the center of the tractor, a pair of husk eliminating rolls arranged along the rear side of said chamber, a generally cylindrical receptacle transversely arranged at the rear of said husk eliminating rolls, a rotatable auger conveyor mounted in said receptacle and arranged to feed material in one direction, the outer end of said receptacle adjacent the discharge end of the auger conveyor being open to discharge husks and other material therefrom, said shelling chamber having an opening at the inner end thereof for discharging cobs and other refuse material into said receptacle, said receptacle having a perforate bottom to provide for the discharge of any shelled grain which may enter the receptacle with husks and cobs, a first compartment beneath the shelling chamber having a perforate bottom, an auger positioned in said first compartment arranged and constructed to carry all material therein across the perforate bottom to permit shelled corn to drop therethrough, said first compartment having an opening in the end thereof whereby the auger in said first compartment feeds foreign matter out the opening in the end of the compartment, a second separate compartment beneath said receptacle and said first compartment, and a cleaning fan adapted to discharge a blast of air through the second of said compartments, whereby dust and other foreign particles are separated from shelled corn coming through the perforate of the receptacle and said first compartment, and auger conveyor means arranged and constructed in the second compartment to deliver cleaned shelled corn toward the center of said tractor, and a wagon elevator extending upwardly and rearwardly from said tractor substantially at the rear and center thereof and arranged and constructed to receive cleaned shelled corn from the auger conveyor in the second compartment.

8. A shelling device for tractor mounted corn harvesters of the type having a picker unit mounted on the side thereof, means on said picker unit for picking ears from standing stalks and carrying the ears rearwardly of the tractor, and the corn shelling device adapted to receive picked ears and being mounted on the tractor at the rear thereof, said corn shelling device including a rotatably driven shelling rotor, a housing enclosing said rotor, a rotatably driven auger conveyor located beneath said shelling rotor and adapted to deliver shelled corn, said housing having perforations in the bottom thereof for passing shelled corn to said auger conveyor, rotatably driven cooperative husk removing rolls mounted on said housing for removing husks from the corn sheller housing, a rotatably driven auger conveyor for discharging husks and cobs located to the rear of said shelling rotor, a housing for said auger conveyor, said last named housing having communicating passageways with the shelling rotor housing, said auger conveyor housing having a perforate bottom, a rotatably driven cleaning fan for said corn arranged and constructed to deliver a blast of air beneath the perforate bottoms of both housing, and said corn sheller arranged and constructed to have all of its constituent rotatably driven elements mounted on transverse axes.

BENJAMIN M. HYMAN.

REFERENCES CITED

The following references are of record in the file of this patent:

UNITED STATES PATENTS

| Number | Name | Date |
|---|---|---|
| 1,064,699 | Berns et al. | June 17, 1913 |
| 2,299,925 | Paradise et al. | Oct. 27, 1942 |
| 2,344,235 | Crumb et al. | Mar. 14, 1944 |
| 2,351,807 | Court | June 20, 1944 |
| 2,443,031 | Gerber | June 8, 1948 |